(12) United States Patent
Nouri et al.

(10) Patent No.: US 12,134,391 B2
(45) Date of Patent: Nov. 5, 2024

(54) TIRE STIFFNESS ESTIMATION SYSTEM

(71) Applicant: The Goodyear Tire & Rubber Company, Akron, OH (US)

(72) Inventors: Arash Nouri, Blacksburg, VA (US); Kanwar Bharat Singh, Bofferdange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 18/056,388

(22) Filed: Nov. 17, 2022

(65) Prior Publication Data

US 2023/0182751 A1   Jun. 15, 2023

Related U.S. Application Data

(60) Provisional application No. 63/289,672, filed on Dec. 15, 2021.

(51) Int. Cl.
*B60W 40/12* (2012.01)
*G01M 17/02* (2006.01)
*G01P 15/00* (2006.01)

(52) U.S. Cl.
CPC ............ *B60W 40/12* (2013.01); *G01M 17/02* (2013.01); *G01P 15/00* (2013.01);
(Continued)

(58) Field of Classification Search
CPC ........... B60W 40/12; B60W 2520/105; B60W 2520/10; G01P 15/00; G01P 17/02
See application file for complete search history.

(56) References Cited

U.S. PATENT DOCUMENTS 5,771,480 A   6/1998  Yanase
6,076,035 A   6/2000  Yanase
(Continued)

FOREIGN PATENT DOCUMENTS

DE   102007052751 A1   5/2009
DE   102014220747 A1   2/2016
(Continued)

OTHER PUBLICATIONS

Danijel Pavkovi and Joško Deur; Jahan Asgari and Davor Hrovat, Experimental analysis of potentials for tire friction estimation in low-slip operating mode, Experimental analysis of potentials for tire friction estimation in ow-slip operating mode, Apr. 3-6, 2006, entire document, entire document.
(Continued)

*Primary Examiner* — Kevin A Lathers
(74) *Attorney, Agent, or Firm* — Edward T. Kennedy

(57) ABSTRACT

A tire longitudinal stiffness estimation system includes an electronic communication system disposed on a vehicle. A sensor is disposed on the vehicle in communication with the electronic communication system, and a processor is accessible through the electronic communication system. The sensor measures parameters associated with the vehicle and communicates data for the parameters to the processor. A mu slip curve generator receives the parameters to generate a mu slip curve in real time from the data. An extraction module extracts raw data from a linear portion of the mu slip curve. A denoising module de-noises the raw data from the mu slip curve by determining a vector for the raw data, an orientation of the vector, and a heading of the vector. The denoising module generates de-noised data, and a stiffness calculator receives the de-noised data and generates a longitudinal stiffness estimate for the tire.

20 Claims, 9 Drawing Sheets

(52) U.S. Cl.
CPC ... *B60W 2520/10* (2013.01); *B60W 2520/105* (2013.01); *B60W 2520/26* (2013.01); *B60W 2720/00* (2013.01); *B60W 2720/28* (2013.01)

(56) References Cited

U.S. PATENT DOCUMENTS

| | | |
|---|---|---|
| 6,539,788 B1 | 4/2003 | Mancosu et al. |
| 6,697,772 B2 | 2/2004 | Mancosu et al. |
| 6,912,896 B2 | 7/2005 | Levy et al. |
| 7,483,821 B2 | 1/2009 | Miyashita et al. |
| 7,912,683 B2 | 3/2011 | Miyashita et al. |
| 8,065,067 B2 | 11/2011 | Svendenius et al. |
| 8,498,775 B2 | 7/2013 | Yngve et al. |
| 9,428,013 B2 | 8/2016 | Singh et al. |
| 9,442,045 B2 | 9/2016 | Singh |
| 9,522,578 B1 | 12/2016 | Singh |
| 9,739,689 B2 | 8/2017 | Singh |
| 9,751,533 B2 | 9/2017 | Singh |
| 9,995,654 B2 | 6/2018 | Singh |
| 10,065,636 B2 | 9/2018 | Varnhagen et al. |
| 10,124,809 B2 | 11/2018 | Thor et al. |
| 10,144,433 B2 | 12/2018 | Jonasson et al. |
| 10,632,978 B2 | 4/2020 | Gustafsson et al. |
| 2004/0225423 A1 | 11/2004 | Carlson et al. |
| 2012/0179327 A1 | 7/2012 | Yngve et al. |
| 2015/0284006 A1* | 10/2015 | Singh ............. B60W 40/068 702/41 |
| 2015/0285712 A1 | 10/2015 | Singh |
| 2016/0202147 A1 | 7/2016 | Svantesson et al. |
| 2016/0368503 A1* | 12/2016 | Jonasson ............. B60R 16/023 |
| 2019/0001757 A1 | 1/2019 | Singh |
| 2020/0271550 A1 | 8/2020 | Svantesson |
| 2020/0290625 A1* | 9/2020 | Berntorp ......... B60W 30/18172 |
| 2022/0169306 A1* | 6/2022 | Ramanujam ......... B62D 5/0463 |

FOREIGN PATENT DOCUMENTS

| | | |
|---|---|---|
| DE | 102018132157 B3 | 6/2020 |
| JP | 2007320401 A | 12/2007 |
| WO | 2020120375 A1 | 6/2020 |

OTHER PUBLICATIONS

Dr. Thomas Raste, Peter Lauer, Bernd Hartmann, Development of a Road Condition Observer for the "Vehicle Motion Control" Project, Development of a Road Condition Observer for the "Vehicle Motion Control" Project, 2018, entire document, entire document.
Fredrik Gustafsson, Monitoring tire-road friction using the wheel slip, IEEE Control Systems Magazine, Aug. 1998, 42-49, vol. 18; Issue 4.
João Paulo Pinto Braz, A Novel Road Grip Estimation Method Using a Vehicle as a Probe, dissertation, May 2019, entire document, entire document.
Extended search report issued in corresponding European application received by applicant Apr. 11, 2023.

* cited by examiner

TIRE STIFFNESS ESTIMATION SYSTEM

FIELD OF THE INVENTION

The invention relates generally to tire monitoring and estimation systems. More particularly, the invention relates to systems that predict certain tire characteristics. Specifically, the invention is directed to a system for estimating the stiffness of a tire in real time.

BACKGROUND OF THE INVENTION

As is known in the art, a vehicle is supported by multiple tires. The stiffness of each tire affects the performance and characteristics of the tire during operation of the vehicle. For example, longitudinal stiffness of the tire, which is the stiffness of the tire in its longitudinal or travel direction, may be employed to distinguish between different road surface conditions and/or different wear states of the tire. In addition, the longitudinal stiffness may be employed to improve the operation of vehicle control systems, such as adaptive cruise control (ACC), anti-lock braking systems (ABS), electronic stability program (ESP), acceleration slip regulation (ASR), and the like.

Due to the usefulness of tire longitudinal stiffness, it is desirable to generate an accurate estimate of the longitudinal stiffness. In the prior art, systems were developed to provide such estimates. However, in order to arrive at accurate longitudinal stiffness estimates, such prior art systems have been complex, often employing data from multiple sources. For example, may be used data from the vehicle, from the tire, and from remote data servers.

The use of such complex systems, as well as data from such a variety of sources, may be undesirably difficult to implement. In addition, such complex systems require a significant amount of computing load. When a significant amount of computing load is involved, such systems may not be able to be executed on a vehicle-mounted processor, thereby undesirably requiring additional resources such as cloud computing, and undesirably taking significant time to generate a real-time estimate.

As a result, there is a need in the art for a system that estimates the longitudinal stiffness of a tire in real time which provides an accurate estimate based on data from limited sources, and which has a low computing load.

SUMMARY OF THE INVENTION

According to an aspect of an exemplary embodiment of the invention, a longitudinal stiffness estimation system for at least one tire supporting a vehicle is provided. The system includes an electronic communication system that is disposed on the vehicle, and at least one sensor disposed on the vehicle which is in electronic communication with the electronic communication system. A processor is accessible through the electronic communication system. The sensor measures selected parameters associated with the vehicle and communicates data for the selected parameters through the electronic communication system to the processor. A mu slip curve generator is in communication with the processor, receives the selected parameters, and generates a mu slip curve in real time from the communicated data. An extraction module is in communication with the processor and extracts raw data from a linear portion of the mu slip curve. A denoising module is in communication with the processor and de-noises the raw data from the mu slip curve by determining a vector for the raw data, an orientation of the vector, and a heading of the vector. The denoising module generates de-noised data, and a stiffness calculator receives the de-noised data and generates a longitudinal stiffness estimate for the tire.

BRIEF DESCRIPTION OF THE DRAWINGS

The invention will be described by way of example and with reference to the accompanying drawings, in which.

Similar numerals refer to similar parts throughout the drawings.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN" is an abbreviation for controller area network, and is used in conjunction with CAN bus, which is an electronic communication system on a vehicle.

"Circumferential" means lines or directions extending along the perimeter of the surface of the annular tread of the tire perpendicular to the axial direction.

"Cloud computing" means computer processing involving computing power and/or data storage that is distributed across multiple data centers, which is typically facilitated by access and communication using the Internet.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Luenberger observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"TPMS" means a tire pressure monitoring system.

DETAILED DESCRIPTION OF THE INVENTION

Figure 1:
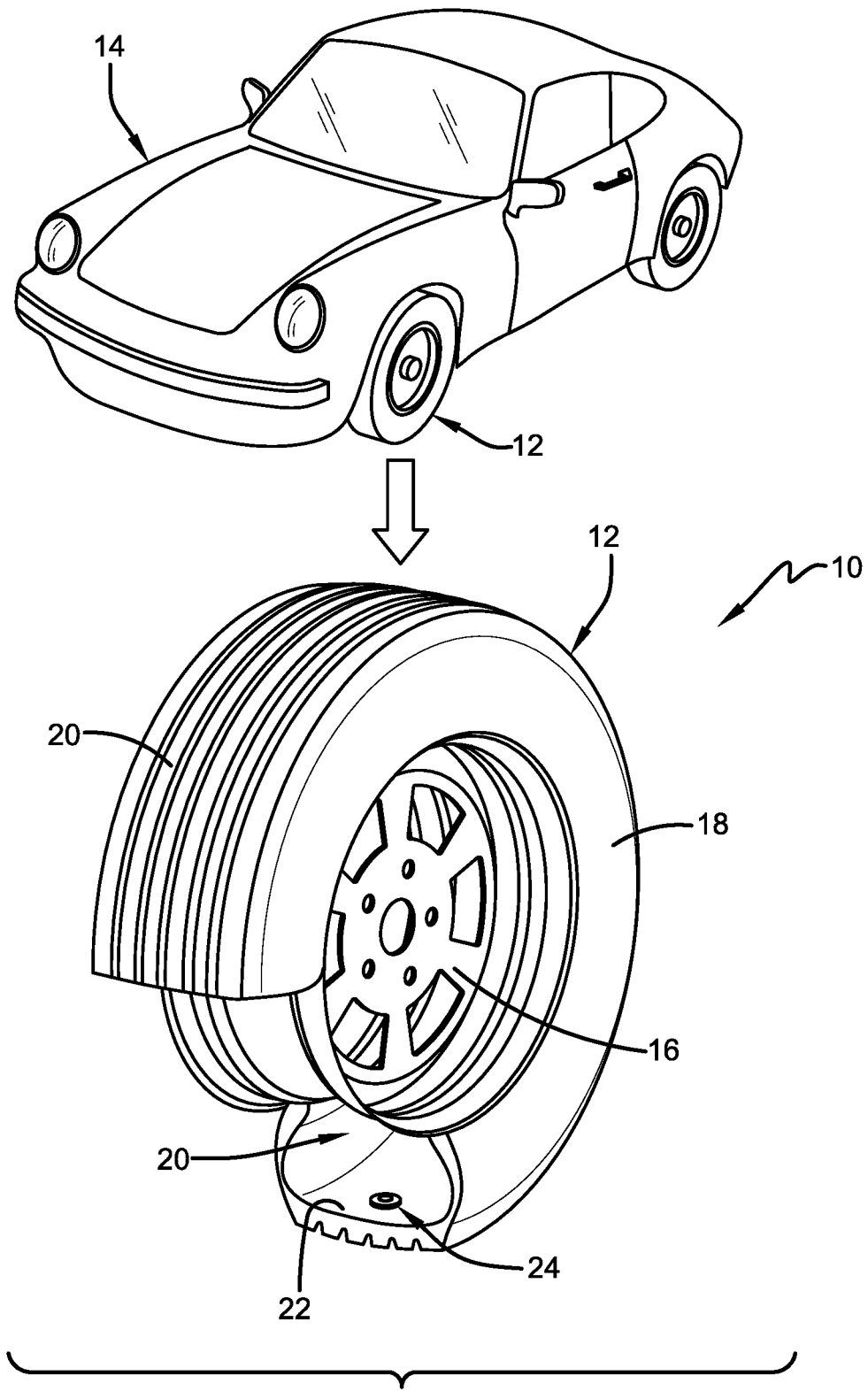
FIG. 1 is a perspective view of a vehicle and a tire employed in conjunction with the longitudinal stiffness estimation system of the present invention.

An exemplary embodiment of the longitudinal stiffness estimation system of the present invention is indicated at 10 in FIGS. 1-9. The system estimates a longitudinal stiffness of a tire 12 that supports a vehicle 14, as shown in FIG. 1. While the vehicle 14 is depicted as a passenger car, the invention is not to be so restricted. The principles of the invention find application in other vehicle categories, such as commercial trucks, in which vehicles may be supported by more or fewer tires.

Each tire 12 is of conventional construction, and is mounted on a wheel 16. Each tire 12 includes a pair of sidewalls 18 that extend to a circumferential tread 20. Each tire 12 may be equipped with a sensor or transducer 24, which may be a tire pressure monitoring (TPMS) module or sensor, and detects tire parameters such as pressure within a tire cavity 20 and tire temperature. The sensor 24 preferably is affixed to an inner liner 22 of the tire 12 by suitable means such as adhesive.

Figure 2:
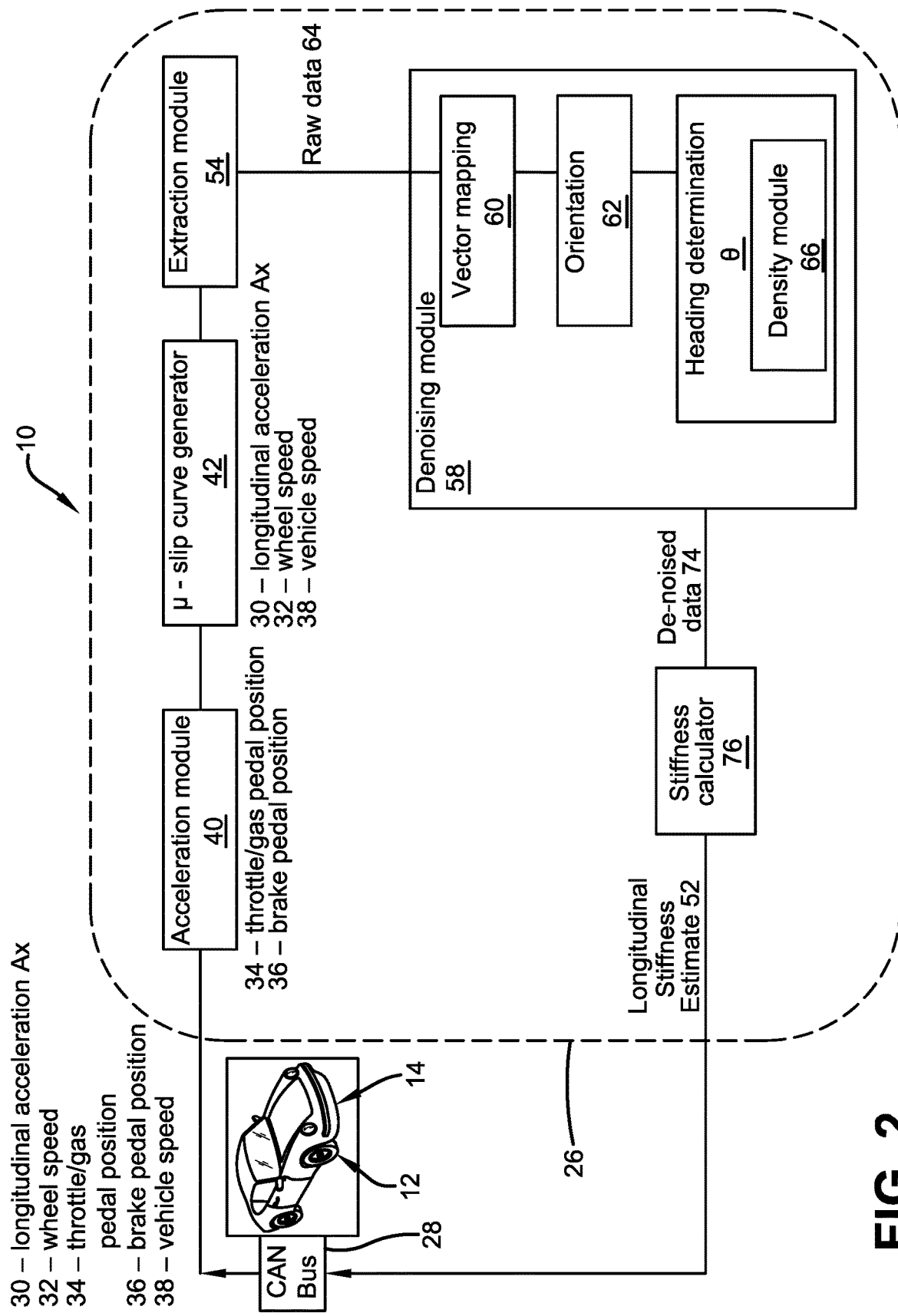
FIG. 2 is a flow diagram showing an exemplary embodiment of the longitudinal stiffness estimation system of the present invention.

The tire 12 includes a longitudinal stiffness, which is its stiffness in a longitudinal or travel direction. Turning to FIG. 2, the longitudinal stiffness estimation system 10 calculates the longitudinal stiffness of the tire 12 by providing a longitudinal stiffness estimate 52. Aspects of the longitudinal stiffness estimation system 10 preferably are executed on a processor 26 that is accessible through an electronic communication system on the vehicle, which enables central communication between multiple vehicle sensors, such as a CAN bus system 28. The processor 26 may be a local processor that is mounted on the vehicle 14, or may be a remote processor, such as a cloud computing processor.

The longitudinal stiffness estimation system 10 preferably provides a longitudinal stiffness estimate 52 for each tire 12 mounted on a driven wheel 16 of the vehicle 14. For example, in a front wheel drive vehicle 14, the system 10 generates a stiffness estimate 52 for each one of the front tires 12. For the purpose of convenience, the system 10 is described with reference to one tire 12, with the understanding that an estimate 52 preferably is provided for each tire 12 mounted on a driven wheel 16 of the vehicle 14.

The longitudinal stiffness estimation system 10 receives as inputs certain parameters measured by sensors that are mounted on the vehicle 14 and which are in electronic communication with the vehicle CAN bus system 28. Specifically, the CAN bus 28 electronically communicates a longitudinal acceleration ($A_x$ or $a_x$) 30 of the vehicle 14, a wheel speed 32, a throttle or gas pedal position 34, a brake pedal position 36, and a vehicle reference speed 38, to an acceleration module 40 and a mu ($\mu$)—slip curve generator 42. The vehicle reference speed 38 may be obtained from a global positioning system (GPS) or other reliable source of the vehicle reference speed.

In the acceleration module 40, the gas pedal position 34 and brake pedal position 36 are employed to confirm that the vehicle 14 is accelerating. For example, if the gas pedal position 34 is below a predetermined throttle threshold, or if the brake pedal position 36 is above a predetermined brake threshold, the system 10 determines that the vehicle 14 is not accelerating. When the vehicle 14 is not accelerating, the system 10 does not proceed to the $\mu$-slip curve generator 42. If the gas pedal position 34 is greater than a predetermined throttle threshold and/or the brake pedal position 36 is below a predetermined brake threshold, the system 10 determines that the vehicle 14 is accelerating and proceeds to the $\mu$-slip curve generator 42.

Figure 3:
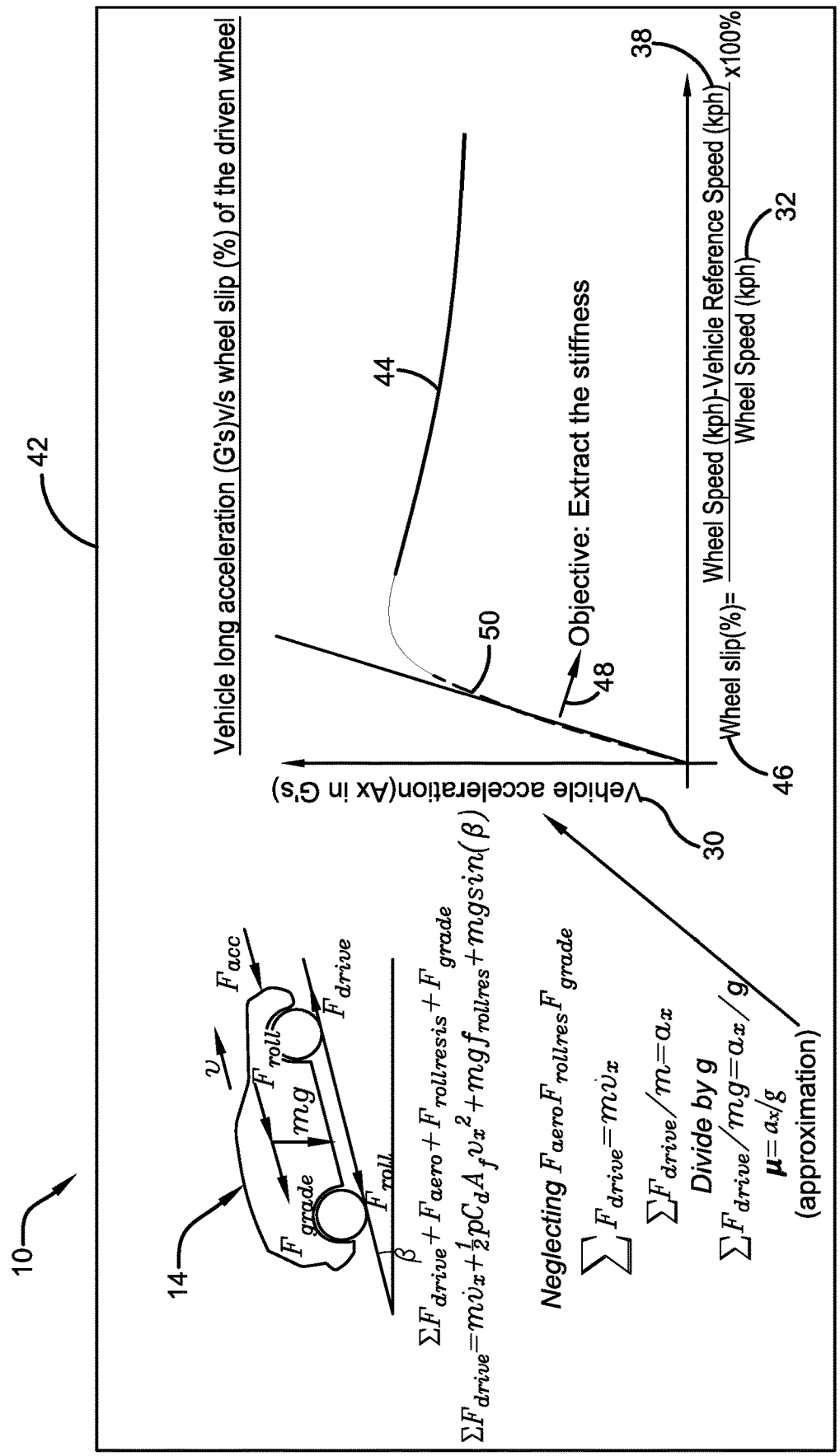
FIG. 3 is a graphical representation of a portion of the longitudinal stiffness estimation system shown in FIG. 2.

With additional reference to FIG. 3, the $\mu$-slip curve generator 42 generates a $\mu$—slip curve 44 in real time. On the vertical axis, the $\mu$-slip curve 44 plots the frictional force between the tire 12 and the surface on which the tire is traveling, represented by the coefficient of friction mu ($\mu$). The $\mu$-slip curve generator 42 employs the longitudinal acceleration 30 of the vehicle 14 to approximate the coefficient of friction $\mu$ during vehicle acceleration. On the horizontal axis, the $\mu$-slip curve 44 plots tire slip 46, which is the relative motion between the tire 12 and the surface on which the tire is traveling. The $\mu$-slip curve generator 42 employs the wheel speed 32 and the vehicle reference speed 38 to calculate slip 46:

$$\text{Slip 46, percent (\%)} = \frac{\text{Wheel Speed 32 } (kph) - \text{Vehicle Reference Speed 38 } (kph)}{\text{Wheel Speed 32 } (kph)} \times 100\%$$

In this manner, the $\mu$-slip curve generator 42 of the longitudinal stiffness estimation system 10 generates a $\mu$-slip curve 44 in real time using input signals from the vehicle CAN bus system 28.

A slope 48 of a linear portion 50 of the $\mu$-slip curve 44 corresponds to the longitudinal stiffness of the tire 12. As will be described in greater detail below, the longitudinal stiffness estimation system 10 extracts the longitudinal stiffness of the tire 12 and provides a longitudinal stiffness estimate 52 in an accurate manner.

Figure 4:
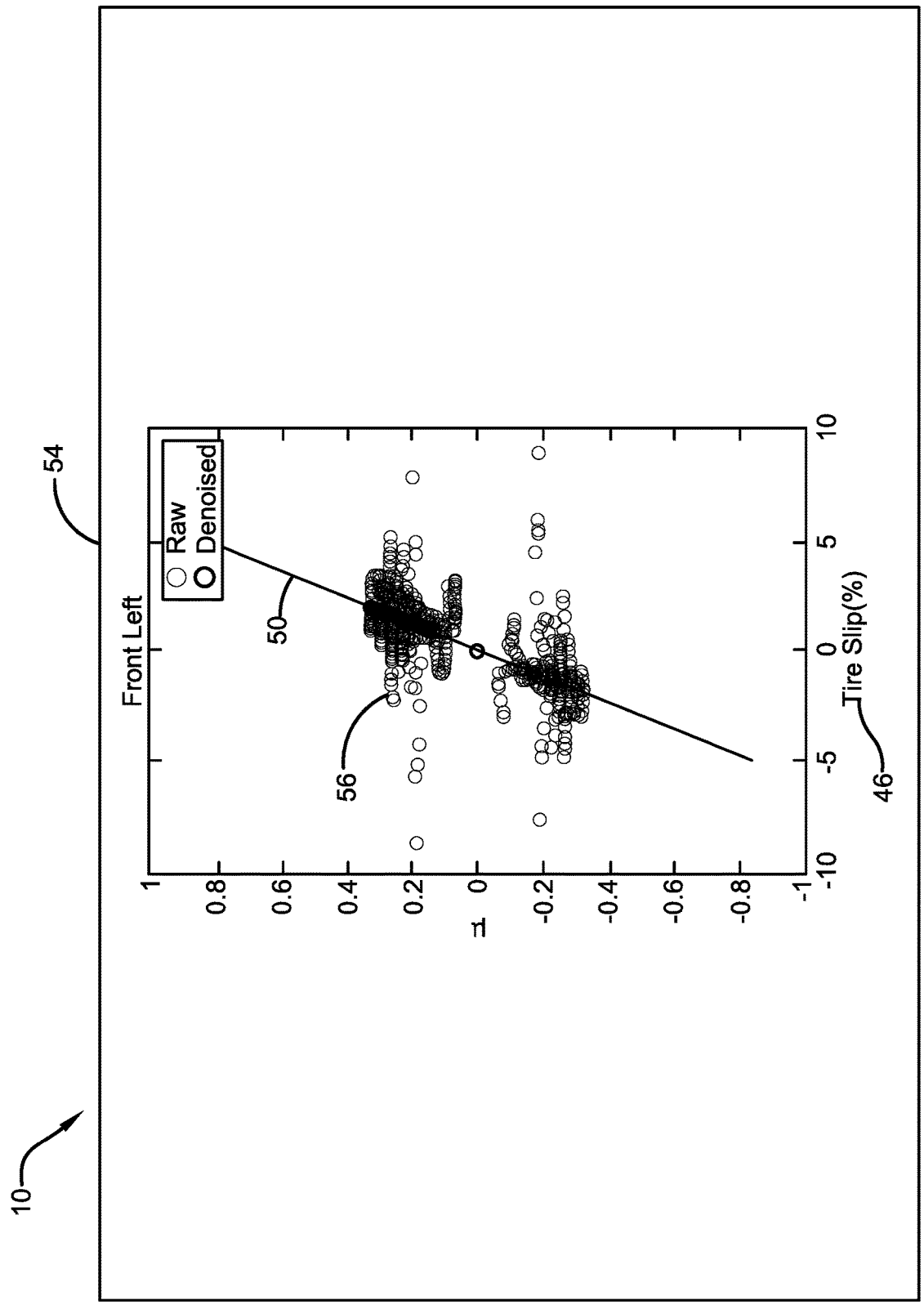
FIG. 4 is a graphical representation of another portion of the longitudinal stiffness estimation system shown in FIG. 2.

Referring to FIGS. 2 and 4, an extraction module 54 extracts raw data 56 from the linear portion 50 of the $\mu$-slip curve 44. The raw data 56 includes signal noise, that is, unwanted modifications in the data that occur during capture, storage, transmission, and/or processing. As a result, the raw data 56 must be de-noised or cleaned to improve its accuracy. It is to be understood that the data shown in FIGS. 4-9 may include hypothetical representations by way of example for the purpose of illustrating the principles of the invention.

Figure 5:
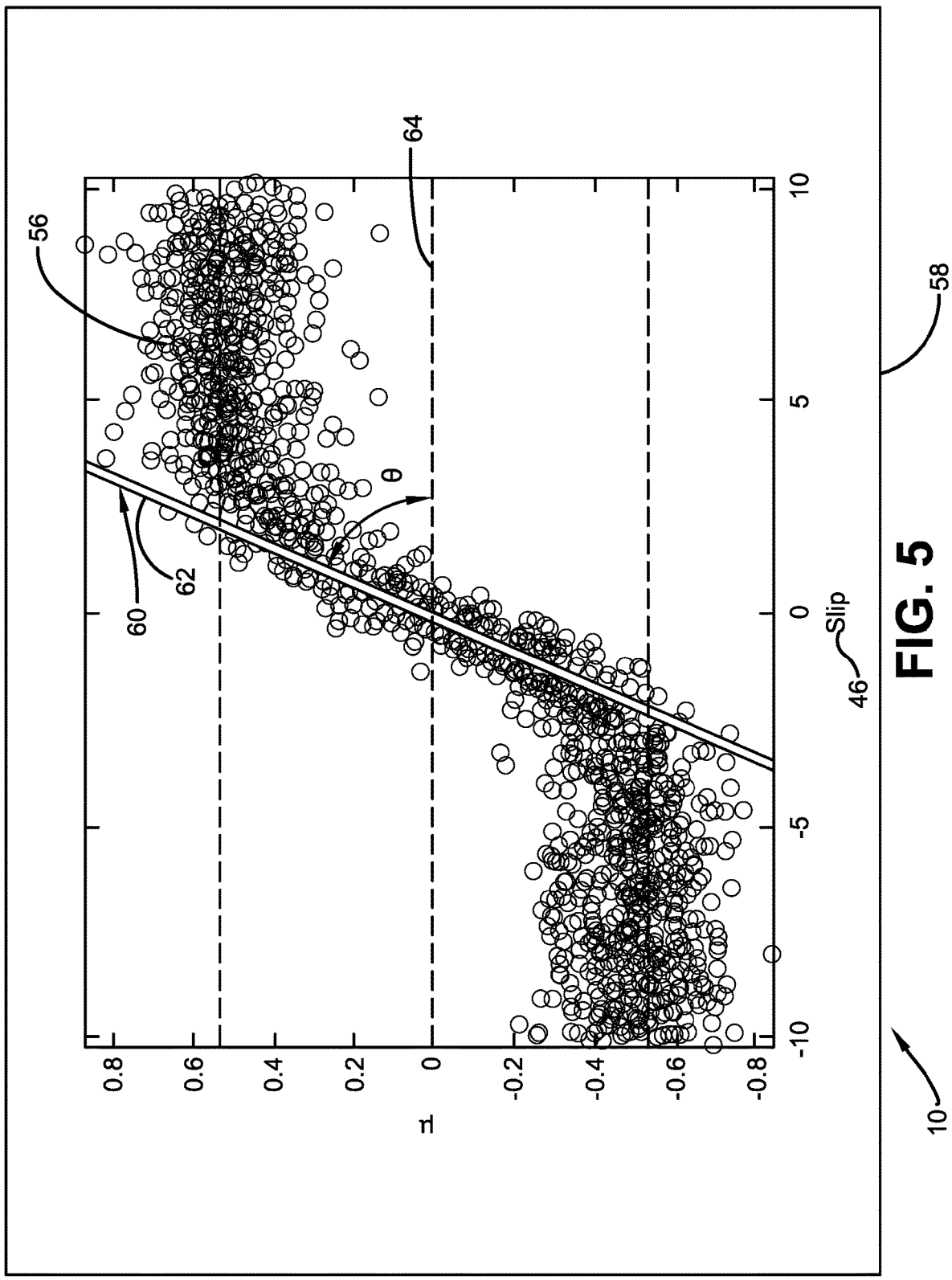
FIG. 5 is a graphical representation of another portion of the longitudinal stiffness estimation system shown in FIG. 2.

Turning now to FIGS. 2 and 5, a denoising module 58 de-noises or cleans the raw data 56. Denoising module 58 preferably applies principal component analysis (PCA) to determine patterns from the raw data 56 for prediction analysis. For example, PCA identifies a principal component or eigenvector, which is a characteristic vector of a linear transformation of the raw data 56. In this manner, a pattern that is visualized or represented by a vector 60 is determined from the raw data 56.

The PCA of the denoising module 58 predicts an orientation 62 of the vector 60, which corresponds to the data variance, rather than predicting each value of the raw data 56. The orientation of the vector 60 and the raw data 56 is determined using the first principal component of the raw data. In addition to the orientation 62, another parameter referred to as a heading of the vector 60, which is indicated at theta (θ), is determined. The heading θ enables an accurate fit of the vector 60 to be obtained that covers the variance of the data. The heading θ is the angle between a horizontal line 64 extending from an origin of μ and the orientation 62 of the vector 60.

For accuracy, the heading θ must reflect a proper alignment of the vector 60 with the data. Since the heading θ is initially an unknown value, a density module 66 is employed to determine the heading. In the density module 66, the determination of an optimum value for the heading θ is driven by the data.

Figure 6:
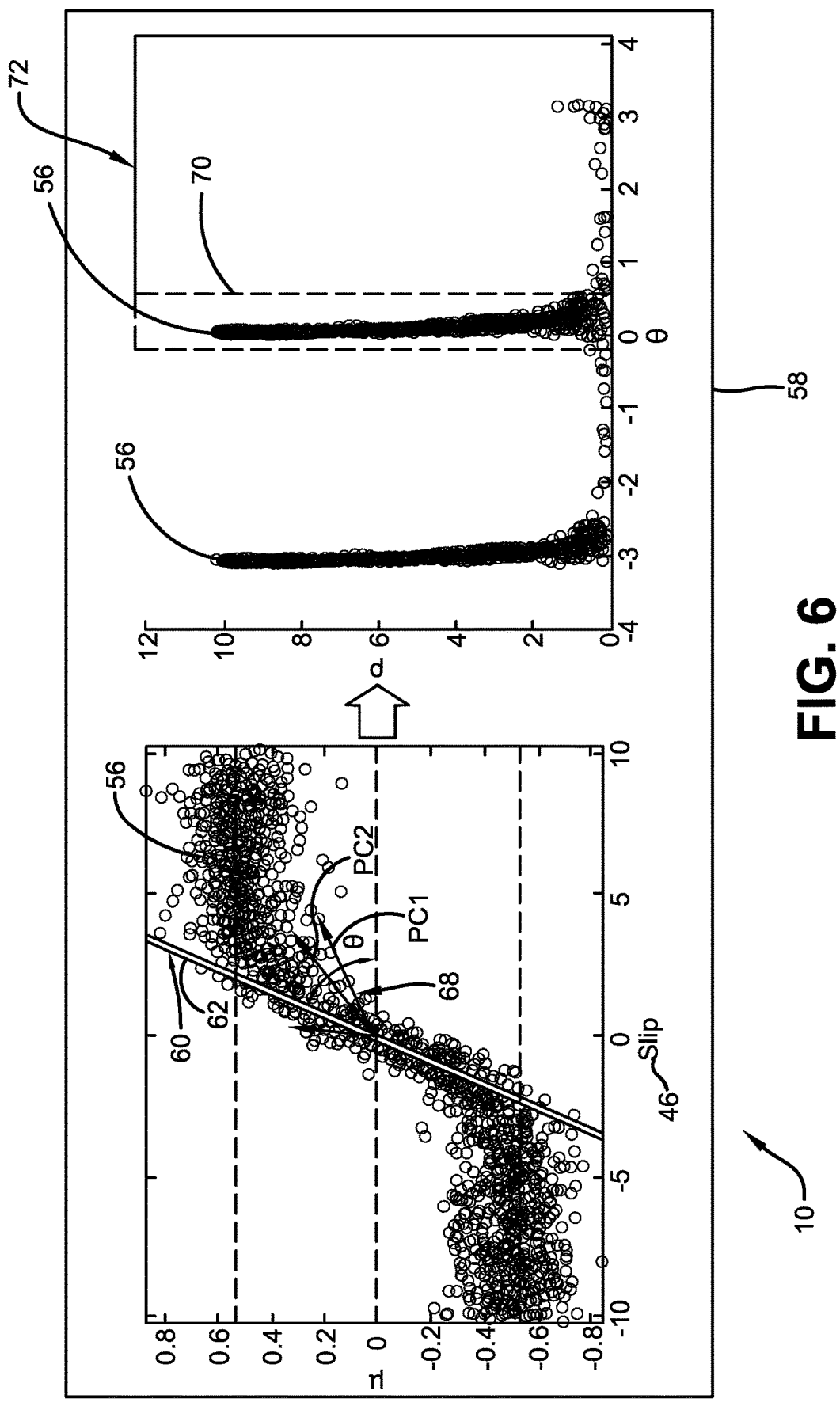
FIG. 6 is a graphical representation of another portion of the longitudinal stiffness estimation system shown in FIG. 2.

With reference to FIGS. 2 and 6, in the density module 66, the data are transformed to polar coordinates 68 and a density versus heading θ plot 72 is generated. Density is indicated by rho (ρ). Because the data are symmetric, positive values may be used for simplicity. In addition, because the data are not continuous, the first ten percent (10%) of the standard deviation of the data is used to select a data range 70. The density p of the data range 70 is calculated based on a median of the data:

$$\text{med}(x)-0.1\sigma(x) < x\_\text{selected} < \text{med}(x)+0.1\sigma(x)$$

A density center of the data range 70 is determined using the median of the headings θ, which corresponds to the optimum value for the heading.

Figure 7:
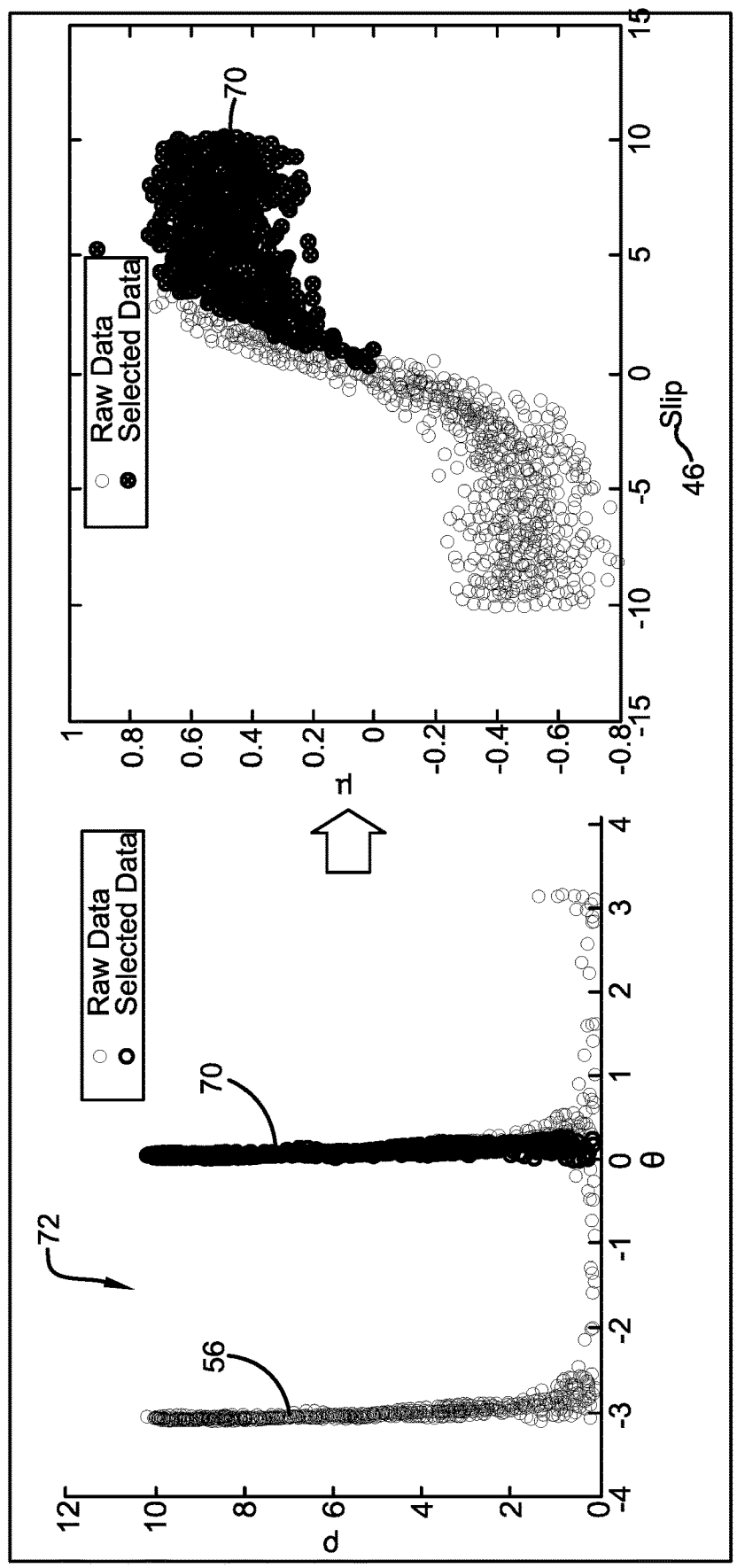
FIG. 7 is a graphical representation of another portion of the longitudinal stiffness estimation system shown in FIG. 2.

With additional reference to FIG. 7, once the heading θ is determined, the data range 70 is transformed back to the μ versus slip 46 plot and the orientation 62 of the vector 60 is calculated using the polar coordinates. Specifically, the coefficient of a second polar axis PC2 is divided by the coefficient of a first polar axis PC1 to determine the orientation 62. In this manner, the orientation 62 and the heading θ for the vector 60 are determined, thus de-noising the data 74.

Once the data has been de-noised 74 by determining the orientation 62 and the heading θ for the vector 60, a stiffness calculator 76 ascertains a slope of the vector. The slope of the vector 60 is the longitudinal stiffness estimate 52 for the tire 12. Preferably, the longitudinal stiffness estimate 52 is communicated by the CAN bus system 28 to other vehicle control systems for use in such systems and/or to determine certain conditions of the tire 12.

Figure 8:
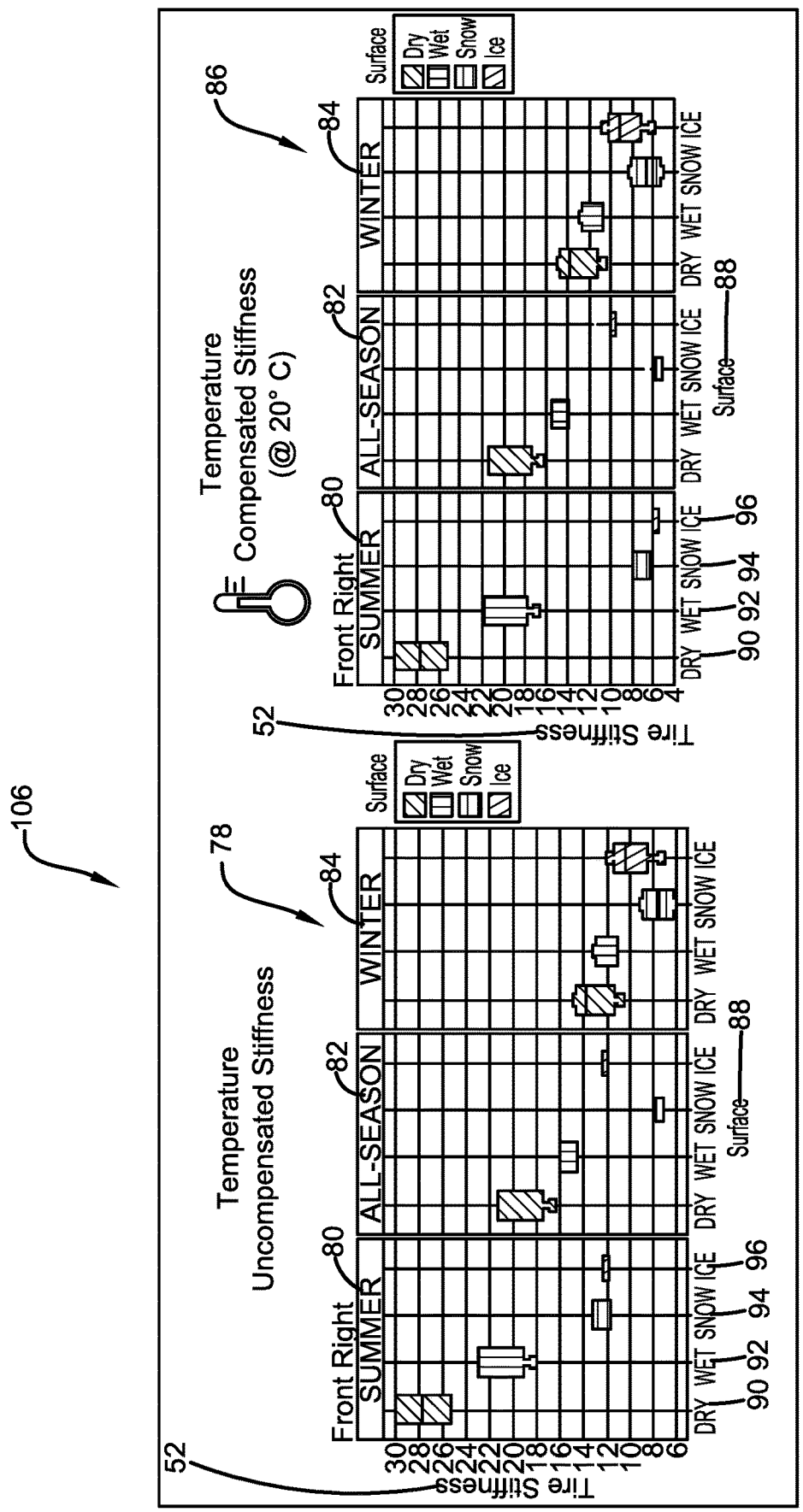
FIG. 8 is a graphical representation of a road surface condition monitor employing the longitudinal stiffness estimation system shown in FIG. 2.

For example, turning to FIG. 8, the longitudinal stiffness estimate 52 may be used in a road state monitor 106 to monitor the condition of a road surface over which the tire 12 travels by distinguishing between different road surface conditions 88. The stiffness 52 of the tire 12 exhibits fast time-varying characteristics on different road surface conditions 88. More particularly, in a non-temperature compensated plot 78, each tire stiffness estimate 52 is different for a summer tire 80, an all-season tire 82, and a winter tire 84 on a dry surface 90, a wet surface 92, a snow-covered surface 94, and an icy surface 96, respectively.

Because tire stiffness is sensitive to temperature, it is important to correct the tire stiffness estimate 52 for the influence of temperature, as shown in temperature-compensated plot 86. From the temperature-compensated plot 86, it can be seen that temperature compensation may exaggerate the differences in the stiffness estimate 52, particularly for the summer tire 80 and the all-season tire 82. In addition, it can be seen that the stiffness estimate 52 for the winter tire 84 generally exhibits a lower dependence on the type of road surface 88, while the stiffness estimate for the summer tire 80 and the all-season tire 82 is higher on an icy surface 96 than on a snow-covered surface 94. Based on this information, the longitudinal stiffness estimate 52 may thus be used by the road surface monitor 106 to distinguish between a dry road surface 90, a wet road surface 92, a snow-covered road surface 94, and an icy road surface 96.

Figure 9:
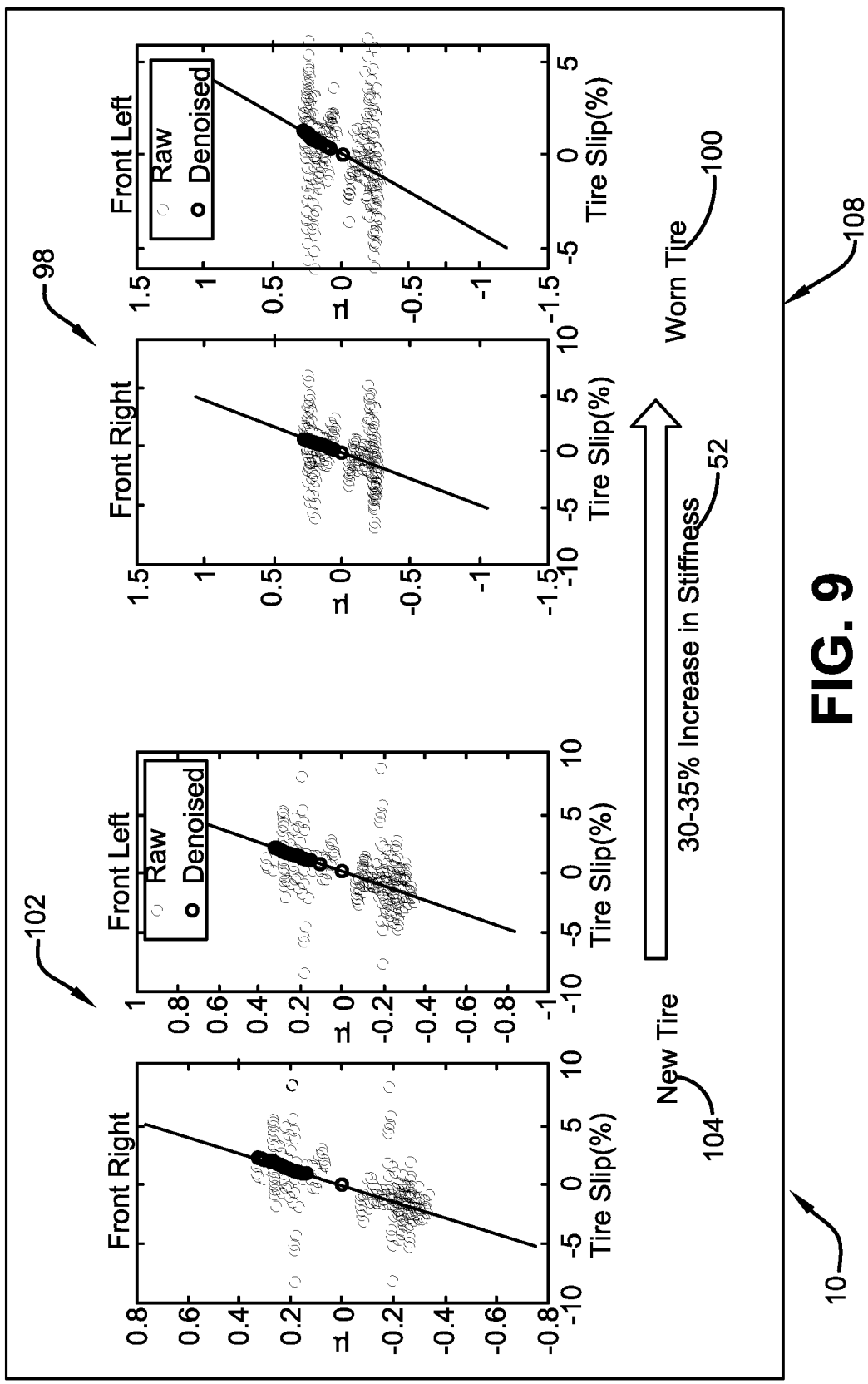
FIG. 9 is a graphical representation of a tire wear monitor employing the longitudinal stiffness estimation system shown in FIG. 2.

With reference to FIG. 9, the longitudinal stiffness estimate 52 may be used in a wear state monitor 108 to monitor the wear state of the tire 12 by distinguishing between different wear states. The stiffness 52 of the tire 12 exhibits slow time-varying characteristics with wear. More particularly, in μ versus slip plots 98 for worn tires 100, the stiffness estimates 52 were at least thirty percent (30%) higher than the stiffness estimates in μ versus slip plots 102 for worn tires 104. Based on this information, the longitudinal stiffness estimate 52 may thus be used by the wear state monitor 108 to distinguish between different wear states of the tire 12.

In this manner, the longitudinal stiffness estimation system 10 of the present invention provides a stiffness estimate 52 for a tire 12 in real time based on input signals from a standard vehicle system, such as the CAN bus system 28. The longitudinal stiffness estimation system 10 of the present invention thus provides an accurate stiffness estimate 52 based on minimal data sources. In addition, the use of the above-described denoising module 58 in the longitudinal stiffness estimation system 10 involves a low computing load, and may thus be executed on a vehicle-based processor 26, as opposed to prior art systems that involve high computing loads and must be executed remotely.

The present invention also includes a method of estimating the longitudinal stiffness of a tire 12. The method includes steps in accordance with the description that is presented above and shown in FIGS. 1 through 9. The longitudinal stiffness estimation system 10 of the present invention and the accompanying method may be referred to as a Nouri technique.

It is to be understood that the structure and method of the above-described stiffness estimation system 10 may be altered or rearranged, or components or steps known to those skilled in the art omitted or added, without affecting the overall concept or operation of the invention. For example, while the system 10 is described above using an acceleration condition of the vehicle 14, the system may be applied to cruising and braking conditions without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A longitudinal stiffness estimation system for at least one tire supporting a vehicle, the longitudinal stiffness estimation system comprising:

an electronic communication system disposed on the vehicle;

at least one sensor disposed on the vehicle and in electronic communication with the electronic communication system;

a processor accessible through the electronic communication system;

the at least one sensor measuring selected parameters associated with the vehicle and communicating data for the selected parameters through the electronic communication system to the processor;

a mu slip curve generator in communication with the processor and receiving the selected parameters and generating a mu slip curve in real time from the communicated data;

an extraction module in communication with the processor and extracting raw data from a linear portion of the mu slip curve;

a denoising module in communication with the processor and de-noising the raw data from the mu slip curve by determining a pattern from the raw data represented by a vector, an orientation of the vector, and a heading of the vector, wherein the denoising module generates de-noised data; and a stiffness calculator receiving the de-noised data and generating a longitudinal stiffness estimate for the at least one tire.

2. The longitudinal stiffness estimation system of claim 1, wherein the selected parameters include at least one of a longitudinal acceleration of the vehicle, a wheel speed, and a vehicle reference speed.

3. The longitudinal stiffness estimation system of claim 2, wherein the mu slip curve generator receives the longitudinal acceleration of the vehicle to approximate mu in the mu slip curve as a coefficient of friction between the tire and a surface on which the tire is traveling.

4. The longitudinal stiffness estimation system of claim 2, wherein the mu slip curve generator receives the wheel speed and the vehicle reference speed to calculate slip in the mu slip curve.

5. The longitudinal stiffness estimation system of claim 1, further comprising an acceleration module, the acceleration module receiving a throttle position and a brake pedal position to determine whether the vehicle is accelerating.

6. The longitudinal stiffness estimation system of claim 1, wherein the pattern is determined as an eigenvector of the raw data.

7. The longitudinal stiffness estimation system of claim 1, wherein the heading of the vector is an angle between a horizontal line extending from an origin of mu in the mu slip curve and the orientation of the vector.

8. The longitudinal stiffness estimation system of claim 1, wherein the denoising module includes a density module to determine the heading of the vector, and the density module transforms the raw data to polar coordinates and generates a density versus heading plot.

9. The longitudinal stiffness estimation system of claim 8, wherein the density module determines a selected data range in the density versus heading plot and calculates a density of the selected data range based on a median of the selected data range.

10. The longitudinal stiffness estimation system of claim 9, wherein the density module determines a density center of the selected data range, the density center corresponding to an optimum value for the heading of the vector.

11. The longitudinal stiffness estimation system of claim 1, wherein the denoising module determines the orientation of the vector using polar coordinates, in which a coefficient of a second polar axis is divided by a coefficient of a first polar axis to determine the orientation of the vector.

12. The longitudinal stiffness estimation system of claim 1, wherein the stiffness calculator ascertains a slope of the vector to generate the longitudinal stiffness estimate.

13. The longitudinal stiffness estimation system of claim 1, wherein the processor is mounted on the vehicle.

14. The longitudinal stiffness estimation system of claim 1, wherein the processor is a cloud computing processor.

15. The longitudinal stiffness estimation system of claim 1, wherein the system provides a longitudinal stiffness estimate for each tire mounted on a driven wheel of the vehicle.

16. The longitudinal stiffness estimation system of claim 1, wherein the longitudinal stiffness estimate is communicated by the electronic communication system to a vehicle control system.

17. The longitudinal stiffness estimation system of claim 1, further comprising a road surface condition monitor, wherein the road surface condition monitor receives multiple longitudinal stiffness estimates, and based on time-varying characteristics of the longitudinal stiffness estimates, the road surface condition monitor distinguishes between at least two of a dry road surface, a wet road surface, a snow-covered road surface, and an icy road surface.

18. The longitudinal stiffness estimation system of claim 17, wherein the road surface condition monitor includes a temperature correction for each longitudinal stiffness estimate.

19. The longitudinal stiffness estimation system of claim 1, further comprising a wear state monitor, wherein the wear state monitor receives multiple longitudinal stiffness estimates, and based on time-varying characteristics of the longitudinal stiffness estimates, the wear state monitor distinguishes between different wear states of the tire.

20. The longitudinal stiffness estimation system of claim 19, wherein the wear state monitor distinguishes between different wear states of the tire based on a worn tire stiffness estimate being higher than a new tire stiffness estimate.

* * * * *